United States Patent
Agee

(10) Patent No.: US 10,836,963 B1
(45) Date of Patent: Nov. 17, 2020

(54) MULTI PASS VERTICAL TUBULAR REACTOR

(71) Applicant: Emerging Fuels Technology, Inc., Tulsa, OK (US)

(72) Inventor: Kenneth L. Agee, Tulsa, OK (US)

(73) Assignee: EMERGING FUELS TECHNOLOGY, INC., Tulsa, OK (US)

( * ) Notice: Subject to any disclaimer, the term of this patent is extended or adjusted under 35 U.S.C. 154(b) by 0 days.

(21) Appl. No.: 16/692,664

(22) Filed: Nov. 22, 2019

Related U.S. Application Data

(62) Division of application No. 16/226,106, filed on Dec. 19, 2018, now Pat. No. 10,662,382.

(51) Int. Cl.
| | | |
|---|---|---|
| *C10G 2/00* | (2006.01) | |
| *B01J 8/00* | (2006.01) | |
| *B01J 8/02* | (2006.01) | |
| *B01J 8/06* | (2006.01) | |
| *C01B 3/38* | (2006.01) | |
| *B01J 8/22* | (2006.01) | |
| *B01J 19/24* | (2006.01) | |

(52) U.S. Cl.
CPC .............. *C10G 2/342* (2013.01); *B01J 8/067* (2013.01); *B01J 8/22* (2013.01); *B01J 19/248* (2013.01); *C01B 3/382* (2013.01); *C10G 2/33* (2013.01); *B01J 2208/00132* (2013.01); *B01J 2219/00835* (2013.01); *C01B 2203/062* (2013.01); *C01B 2203/1241* (2013.01)

(58) Field of Classification Search
CPC ......... B01J 8/00; B01J 8/02; B01J 8/06; B01J 8/067; B01J 8/18; B01J 8/20; B01J 8/22; B01J 19/00; B01J 19/24; B01J 19/2425; B01J 19/248; B01J 2208/00; B01J 2208/00008; B01J 2208/00017; B01J 2208/00115; B01J 2208/00132; B01J 2219/00; B01J 2219/00781; B01J 2219/00819; B01J 2219/00835; C01B 3/00; C01B 3/02; C01B 3/32; C01B 3/34; C01B 3/38; C01B 3/382; C01B 2203/00; C01B 2203/06; C01B 2203/062; C01B 2203/12; C01B 2203/1205; C01B 2203/1211; C01B 2203/1235; C01B 2203/1241; C10G 2/00; C10G 2/30; C10G 2/32; C10G 2/33; C10G 2/34; C10G 2/342
See application file for complete search history.

(56) References Cited

FOREIGN PATENT DOCUMENTS

WO  WO-2017027491 A1 * 2/2017 ............ B01J 8/0449

* cited by examiner

*Primary Examiner* — Natasha E Young
(74) *Attorney, Agent, or Firm* — Head, Johnson, Kachigian & Wilkinson, PC

(57) ABSTRACT

A process for conducting an exothermic reaction in a vertical tubular reactor comprising; providing a reactor with two or more reaction zones each containing multiple tubes attached to common tube sheets at top and bottom, each zone separated by segmented baffles in the top head and the bottom head.

6 Claims, 2 Drawing Sheets

MULTI PASS VERTICAL TUBULAR REACTOR

CROSS REFERENCE

This application is based on and claims priority to U.S. patent application Ser. No. 16/226,106, now U.S. Pat. No. 10,662,382, filed Dec. 19, 2018.

BACKGROUND OF THE INVENTION

Field of the Invention

This invention relates generally to a catalyst/reactor system for exothermic catalytic reactions, particularly Fischer Tropsch and related reactions.

Description of the Related Art

Exothermic chemical reactions require excellent heat transfer to maintain the reaction within a targeted temperature range, especially in a commercial process unit, such as in chemical plants or petroleum refineries where great amounts of heat need to be transferred. An example of an exothermic chemical reaction is the Fischer Tropsch reaction.

Various processes are known for the conversion of carbonaceous feeds or light hydrocarbon containing gases into normally liquid products such as methanol, higher alcohols, and hydrocarbon fuels and chemicals, particularly paraffinic hydrocarbons. Such processes are directed at the objective of adding value to the feedstock by making a transportable, more valuable product such as diesel fuel or jet fuel or chemicals such as base oils or drilling fluids.

The Fischer Tropsch process can be used to convert such feedstocks into more valuable easily transportable liquid hydrocarbon products and chemicals. The feedstock is first converted to synthesis gas comprising carbon monoxide and hydrogen. The synthesis gas is then converted to heavy hydrocarbon products using a Fischer Tropsch catalyst. The heavy hydrocarbon products can be subjected to further workup by hydroprocessing, such as hydrocracking and/or hydroisomerization and distillation, resulting in, for example, a high yield of high-quality middle distillate products such as jet fuel or diesel fuel. The heavy hydrocarbon products can also be upgraded to specialty products such as solvents, drilling fluids, waxes, or lube base oils due to the high purity of the Fischer Tropsch products.

Processes that convert light hydrocarbons to heavier hydrocarbon products for example generally have three steps:
1) conversion of a carbonaceous feedstock such as natural gas, coal, petroleum coke, heavy oils, biomass, landfill gas, biogas, and municipal waste into synthesis gas comprising carbon monoxide and hydrogen;
2) conversion of the synthesis gas to heavy hydrocarbons via the Fischer Tropsch reaction; and
3) hydroprocessing the heavy hydrocarbon product to one or more finished hydrocarbon products.

The design of a Fischer Tropsch reactor is of paramount importance for the technical and economic success of a plant designed for the conversion of synthesis gas into hydrocarbons. The reactor may be a fluidized bed, slurry bubble column, or fixed bed reactor. Several different fixed bed reactor designs have been used for the Fischer Tropsch reaction, such as lamella plate, double tube, micro channel, and vertical tubular fixed bed. The reactor of the present invention is a vertical tubular fixed bed reactor.

The reactor must meet many conditions and process requirements such as minimum complexity, ease of construction, minimum number of tubes, high selectivity towards desired products, high per pass conversion, and low pressure drop.

It follows that the design of a vertical tubular fixed bed reactor cannot be done without taking into account the characteristics and performance of the catalyst to be used. While the examples herein are for the Fischer Tropsch reaction, the multi pass fixed bed vertical tubular reactor of the present invention can be used for any exothermic reaction that can be conducted with a fixed bed of catalyst.

For applications that require one or more Fischer Tropsch reactors that are relatively small volume, less than 500 BPD, preferably less than 100 BPD, it may be desirable to construct a Fischer Tropsch reactor that has a very short tube length, allowing it to be configured and pre-piped so that it can be transported to an operating site ready to operate with very little additional set-up. For these applications, a vertical tubular Fischer Tropsch reactor may be designed so that the actual tube length is about 6 feet or less. It is desirable to install the Fischer Tropsch reactor on a transportable skid pre-piped and ready for deployment. For road transportation, the height limit is generally less than 14 feet. Assuming a diameter between 3 feet and 6 feet and head height of approximately half the diameter, the heads and tube sheets can add another 3 to 6 feet of height. Any nozzle or piping requirements could add more to the height, and there is need to raise the bottom of the reactor off of the skid, and the skid thickness can add another foot. Therefore, to configure vertically on a skid pre-piped for highway transport, the tube length is limited to about 6 feet or less than 2 meters. Another option is to build the reactor in a horizontal structure, which will be transported to a site horizontally and then lifted in the field location and installed vertically. With this option it is practical to use a tube length of about 20 feet or more or greater than 6 meters.

The gas volume that must be processed in the Fischer Tropsch reactor for a given output can vary significantly depending on feed gas conditions and how the Fischer Tropsch system is configured. For example, for a natural gas feed with a low inert content and operating in recycle mode with 60% conversion per pass and 90% overall conversion at 350 psig inlet pressure and 320 productivity (volume of carbon monoxide converted per volume of catalyst per hour), the gas velocity for a 20 foot tube length is 21 cm/s. This is an actual velocity at reactor conditions. Depending on catalyst particle size a good target velocity for adequate heat transfer and reasonable pressure drop will be 20 to 30 cm/s.

For a lower pressure operation, on a feed source which has more inert gas in the feed, the volume of gas is much higher. For example, on a biogas feed source operating the Fischer Tropsch reaction at 150 psig with 40% conversion per pass (90% overall conversion) in a recycle mode and operating at 180 productivity, the gas volume is much higher. In fact, the actual gas volume at the reactor inlet for this case is 2.85× higher than the case described above, for the same production of products. This case is also complicated by the lower pressure, therefore to have an acceptable velocity and pressure drop in the reactor, the reactor geometry needs to be adjusted to increase the cross-sectional area. This can be done with a larger number of tubes that are shorter. In this case, if the tube length is 6 feet, the velocity is 22.6 cm/s. These extremes show that the effective reactor geometry can be designed to accommodate a wide range of conditions for a reactor that is pre-piped in the shop for quick field installation.

An objective of the present invention is to give design flexibility to set approximate velocity and pressure drop in a fixed bed tubular reactor that can be pre-piped in a shop and transported to a remote site for operation, with minimal field installation work.

SUMMARY OF THE INVENTION

In general, in a first aspect, the invention relates to a process for conducting an exothermic reaction in a vertical tubular reactor, the process comprising providing a reactor with two or more reaction zones, each containing multiple tubes attached to common tube sheets at top and bottom, each zone separated by segmented baffles in a top head and in a bottom head. The exothermic reaction may be a Fischer Tropsch reaction.

The tubes may each be less than 2 meters long and may be capable of being installed pre-piped vertically on a skid for transport to a remote location. Alternately, the tubes may each be greater than 6 meters long and may be capable of being installed and pre-piped on a horizontal skid for transport to a remote location, where the skid is capable of being installed in a vertical orientation. The number of tubes in each zone may be the same or different. All of the tubes in each zone may have the same diameter, but the diameter of the tubes in one zone may be different than the diameter of the tubes in another zone. The tubes may contain catalyst, the catalyst comprising extrudates, spheres, tablets, crushed and sieved particles, or other particles, or a combination thereof. The process may further comprise feed gas flowing through the reaction zones in series. The tubes may contain cobalt catalyst and the cobalt catalyst may comprise more than 15% by weight cobalt. The process may further comprise operating above 300 volumes of carbon monoxide converted per volume of catalyst per hour. The process may further comprise providing coolant selected from water, boiling water, hydrocarbons, boiling hydrocarbons, heat transfer fluid, heat transfer salt, or other coolant. The tubes may contain catalyst with a particle size greater than 0.3 mm in diameter. The tubes may have an oval or irregularly shaped cross section. The process may further comprise adding or removing gasses or liquids between reaction zones.

In a second aspect, the invention relates to a vertical tubular reactor comprising: at least two reaction zones; a plurality of tubes located in each reaction zone, where each tube has a top end and a bottom end; a top head with at least one segmented baffle separating the reaction zones; a bottom head with at least one segmented baffle separating the reaction zones; a common top tube sheet to which all the tubes attach at their top ends, such that the tubes are in fluid communication with the top head through the top tube sheet; and a common bottom tube sheet to which all the tubes attach at their bottom ends, such that the tubes are in fluid communication with the bottom head through the bottom tube sheet.

The at least two reaction zones may comprise a first reaction zone and a second reaction zone, the reactor further comprising: an inlet nozzle in fluid communication with the top head in the first reaction zone; and a transfer tube in fluid communication with the bottom head in the first reaction zone and the top head in the second reaction zone. The reactor may further comprise an outlet nozzle in fluid communication with the bottom head in the second reaction zone. Alternately, the at least two reaction zones may further comprise a third reaction zone, the reactor further comprising: a second transfer tube in fluid communication with the bottom head in the second reaction zone and the top head in the third reaction zone; and an outlet nozzle in fluid communication with the bottom head in the third reaction zone. The tubes may be at least partially filled with catalyst and may be at least partially surrounded by heat transfer fluid. The rector may further comprise one or more nozzles, each nozzle in fluid communication with the top head or the bottom head such that gasses may travel through the reaction zones in sequence and additional gasses may be added or a portion of the gasses may be removed between reaction zones.

Figure 1:
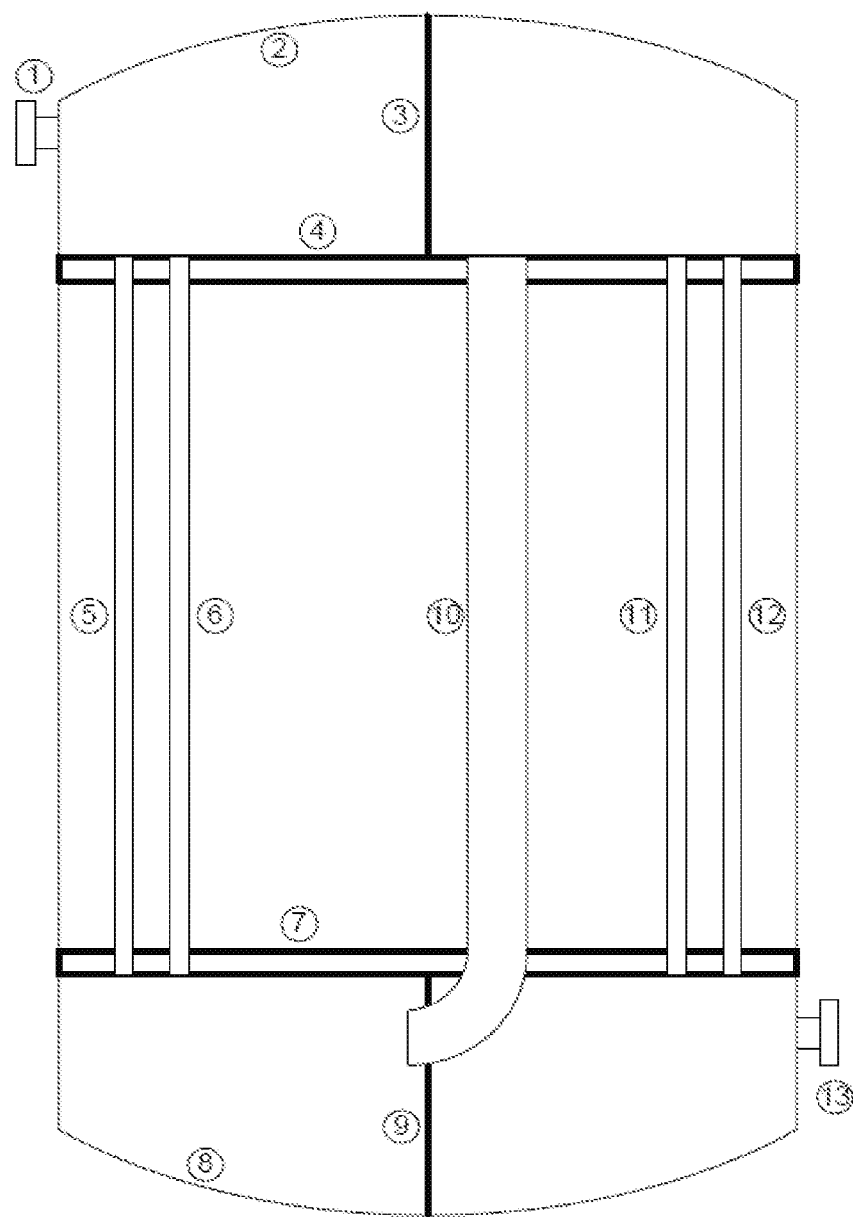
FIG. 1 shows a preferred embodiment of the present invention with a single segmented baffle in each head.

Other advantages and features will be apparent from the following description and from the claims.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

In general, in a first aspect, the invention relates to a multi pass vertical tubular reactor.

The reactor of the present invention may have tubes of less than 2 meters long (6.56 feet) or greater than 6 meters long (19.68 feet) and may optionally have one or more segmented baffles in the top and bottom heads to separate the tubes into zones. If the process design requires a tube length of approximately 10 to 14 feet, a single baffle in the top and bottom head may segment the tubes into two passes so that, when operated in series with 6-foot tube length, the effective tube length is approximately 12 feet. If the process design requires an effective tube length of 15 to 20 feet, the reactor may be configured with two segmented baffles at top and bottom and may operate with three zones for an effective tube length of 18 feet when the actual tubes are 6 foot long. If the process design requires a tube length greater than 20 foot, the reactor may be built with two or more passes or on a horizontal skid with 20-foot tube length, for example, and with segmented baffles so that an effective length of 20, 40, or even 60 feet can be achieved. The use of segmented baffles and short tube length makes it possible to shop fabricate and pre-pipe the reactor for a broad range of process requirements.

The use of segmented baffles also makes it possible to adjust gas composition between the segments. When the reactor is designed with segmented baffles, the gas exiting one set of tubes may be piped externally from the bottom of the reactor to the top head for introduction to the next set of tubes. Alternatively, the gas may be transferred via internal tube or passage into the top head of the next set of tubes. This avoids external piping that can take up space and make the reactor less accessible. With internal transfer tubes or passages, the reactor may have only one gas inlet nozzle and one gas exit nozzle even if there are two or three or more segmented tube zones. However, if it is desirable to remove or add gases between zones, additional nozzles may be added to the top or bottom head as required. Gas addition between zones may be used, for example, to add hydrogen to keep the H2:CO ratio above a minimum limit or to add light olefins to improve product selectivity. Gas removal may be used to condense and remove some of the water so it does not build up above targets considered safe for the operation of the catalyst. Other uses of intermediate addition or removal of gases or products will be known to one skilled in the art.

Another aspect of designing the reactor with segmented baffles that demonstrates the flexibility afforded the designer is that the number of tubes in each zone does not have to be equal, which is not possible in a larger shell with full length tubes. If the feed gas is rich in reactive components and the volume of gas shrinks substantially as the reaction proceeds to higher conversion, it may be desirable to design the reactor with a decreasing number of tubes for each subsequent zone in order to maintain relatively constant gas velocity; or, if the reaction rate decreases as the reaction proceeds, it may be desirable to increase the tube size (diameter) in subsequent zones to reduce the reactor cost.

The use of segmented baffles may give the reactor designer a good deal of flexibility, including:
1) the option to design a fixed bed tubular reactor to be pre-piped during shop fabrication and installed in a vertical configuration for operation such that the effective tube length may be 2, 3, 4, or more times what the actual tube length is;
2) allowing for addition or removal of liquid or gas components at what is an intermediate point along the effective tube length; and
3) allowing for variation in tube count, tube diameter, or reactor effective cross-sectional area at different points in the reactor.

The term "effective cross-sectional area" of a zone is the total of the cross-sectional area of all of the tubes in the zone.

The term "effective tube length" as used herein refers to the total length of tubes in series in one shell. With segmented baffles of the present invention, 2, 3, or more groups of tubes could be operated in series fashion in one shell so that the effective tube length is the summation of the tube length of the series. However, as pointed out above, by configuring the tubes in multiple sections and controlling the flow through the tubes with segmented baffles and optionally internal transfer tubes, many advantages and design options are available to the designer.

By controlling the installation of piping and instrumentation in a shop, the fabrication cost and schedule may be reduced. Shop fabrication may be a controlled environment with the potential for many opportunities to save time and resources and improve quality. It is generally desirable to do as much work as possible in the shop and to minimize the field installation. One of the main objectives of the present invention is to reduce field installation time and expense.

Referring to FIG. 1, an inlet nozzle (1) may be attached to one zone of the reactor defined as the inlet zone and separated by a segmented baffle (3) in top head (2) so that gas entering nozzle (1) can only go through a portion of the reactor tubes defined as the first pass or zone. Tubes may be arranged vertically between tube sheets (4) and (7). Tubes (5) and (6) may represent a larger number of tubes not shown in the figure. The number of tubes can vary from a few to hundreds or even thousands in each zone, which may be referred to as either a pass or zone of the reactor. For example, the reactor shown in FIG. 1 has two passes or zones. Tubes (5) and (6) may be filled with catalyst. The catalyst fill may include some portion of inert material at top and bottom of each tube, as known to one skilled in the art. Reactive gases may enter nozzle (1) and pass through all tubes in the first pass, represented here by tubes (5) and (6). Any unreacted gases and products may exit the tubes in the first pass and collect in the bottom head (8) limited by the lower segmented baffle (9). Unreacted gases from the first pass may be transferred to the top head of the next pass by transfer tube (10). Transfer tube (10) may be any shape of passage and may be an external tube, but preferably may be an internal tube. The unreacted gases transferred by transfer tube (10) may collect in the top head separated from feed gas by segmented baffle (3) and may move down vertically through all the tubes in the second pass represented here by tubes (11) and (12). Unreacted gases and products from the second pass may collect in the bottom head separated from the first pass exit gas by segmented baffle (9) and may exit the reactor via reactor outlet nozzle (13). Some heavy hydrocarbon products may collect in the bottom head for both passes and may be removed via nozzles not shown. The shell side of the reactor may be filled with a heat transfer fluid to remove reactive heat. The heat transfer fluid may be any heat transfer fluid known to one skilled in the art, such as boiling water, and may be moved by forced circulation or thermosiphon.

Figure 2:
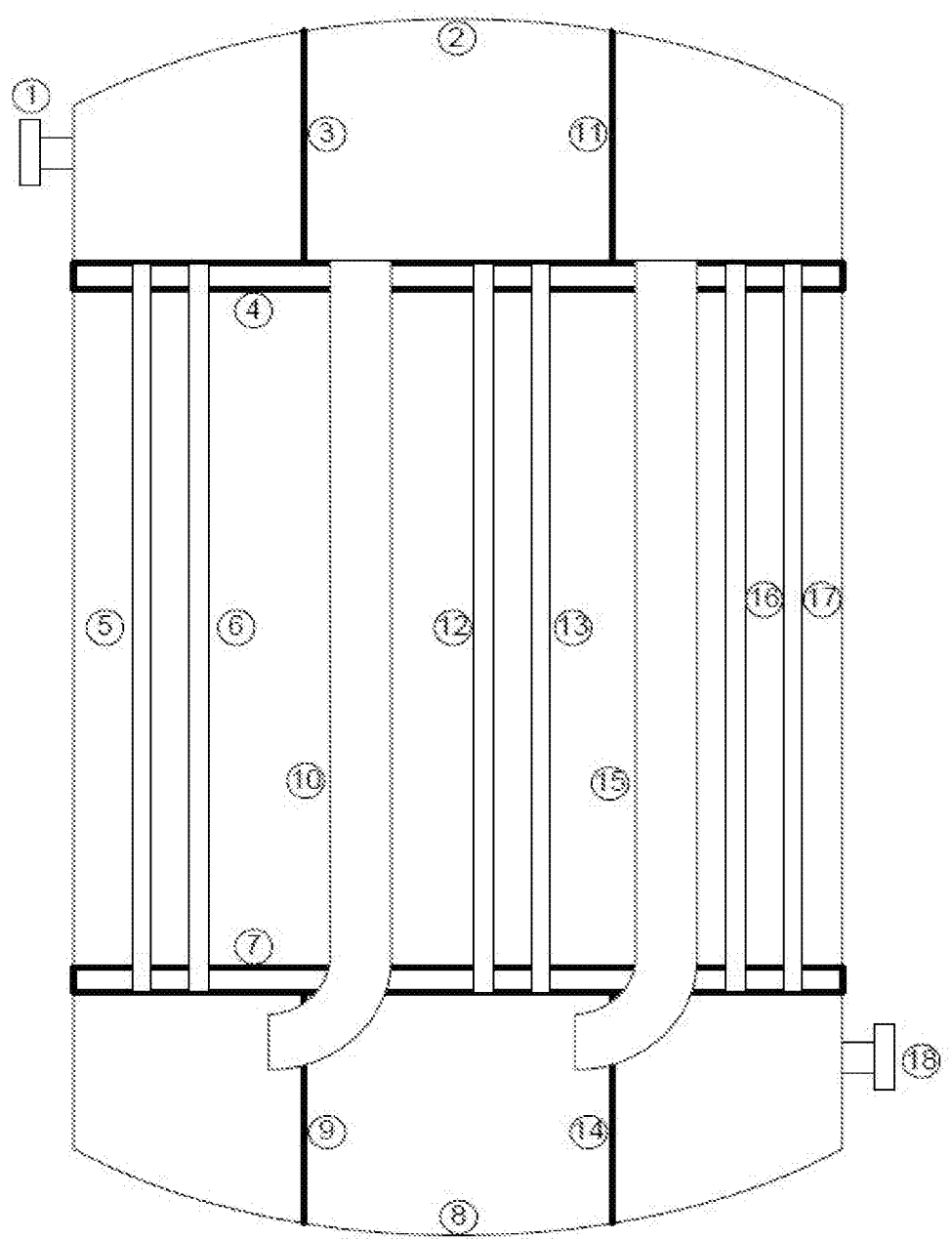
FIG. 2 shows another preferred embodiment of the present invention with two segmented baffles in each head.

Referring to FIG. 2, an inlet nozzle (1) may be attached to one zone of the reactor defined as the inlet zone and separated by a segmented baffle (3) in top head (2) so that gas entering nozzle (1) can only go through a portion of the reactor tubes defined as the first pass or zone. Tubes may be arranged vertically between tube sheets (4) and (7). Tubes (5) and (6) may represent a larger number of tubes not shown in the figure. The number of tubes can vary from a few to hundreds or even thousands in each zone, which may be referred to as either a pass or zone of the reactor. For example, the reactor shown in FIG. 2 has three passes or zones. Tubes (5) and (6) may be filled with catalyst. The catalyst fill may include some portion of inert material at top and bottom of each tube, as known to one skilled in the art. Reactive gases may enter nozzle (1) and pass through all tubes in the first pass, represented here by tubes (5) and (6). Any unreacted gases and products may exit the tubes in the first pass and collect in the bottom head (8) limited by the lower segmented baffle (9). Unreacted gases from the first pass may be transferred to the top head of the next pass by transfer tube (10). Transfer tube (10) can be any shape of passage and can be an external tube, but preferably may be an internal tube. The unreacted gases transferred by transfer tube (10) may collect in the top head separated from first pass feed gas by segmented baffles (3) and third pass feed gas by segmented baffle (11) and may move down vertically through all the tubes in the second pass or zone represented here by tubes (12) and (13). Unreacted gases and products from the second pass may collect in the bottom head separated from the first pass exit gas by segmented baffle (9) and from the third pass exit gas by segmented baffle (14). Unreacted gases from the second pass may be transferred to the top head of the third pass by transfer tube (15). The unreacted gases transferred by transfer tube (15) may collect in the top head separated from second pass feed gas by segmented baffle (11) and may move vertically down through all the tubes in the third pass zone represented here by tubes (16) and (17). Unreacted gases and products from the third pass may collect in the bottom head separated from the second pass exit gas by segmented baffle (14) and may exit the reactor via reactor outlet nozzle (18). Some heavy hydrocarbon products may collect in the bottom head for all three passes and may be removed via nozzles not shown. The shell side of the reactor may be filled with a heat transfer fluid to remove reactive heat. The heat transfer fluid may be boiling water and may be moved by forced circulation or thermosiphon.

The embodiments discussed herein are merely illustrative of specific manners in which to make and use the invention and are not to be interpreted as limiting the scope of the instant invention. While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for the purposes of exemplification.

Whereas, the devices and methods have been described in relation to the drawings and claims, it should be understood that other and further modifications, apart from those shown or suggested herein, may be made within the spirit and scope of this invention.

What is claimed is:

1. A vertical tubular reactor comprising:
   at least two reaction zones, where the at least two reaction zones comprise a first reaction zone and a second reaction zone;
   a plurality of tubes located in each reaction zone, where each tube has a top end and a bottom end;
   a top head with at least one segmented baffle separating the reaction zones;
   a bottom head with at least one segmented baffle separating the reaction zones;
   a common top tube sheet to which all the tubes attach at their top ends, such that the tubes are in fluid communication with the top head through the top tube sheet;
   a common bottom tube sheet to which all the tubes attach at their bottom ends, such that the tubes are in fluid communication with the bottom head through the bottom tube sheet;
   an inlet nozzle in fluid communication with the top head in the first reaction zone; and
   a transfer tube in fluid communication with the bottom head in the first reaction zone and the top head in the second reaction zone.

2. The reactor of claim 1 further comprising an outlet nozzle in fluid communication with the bottom head in the second reaction zone.

3. The reactor of claim 1 where the at least two reaction zones further comprises a third reaction zone, the reactor further comprising:
   a second transfer tube in fluid communication with the bottom head in the second reaction zone and the top head in the third reaction zone; and
   an outlet nozzle in fluid communication with the bottom head in the third reaction zone.

4. The reactor of claim 1 where the tubes are at least partially filled with catalyst.

5. The reactor of claim 1 where the tubes are at least partially surrounded by heat transfer fluid.

6. The reactor of claim 1 further comprising one or more nozzles, each nozzle in fluid communication with the top head or the bottom head such that gasses may travel through the reaction zones in sequence and additional gasses may be added or a portion of the gasses may be removed between reaction zones.

* * * * *